United States Patent
Kropp

(10) Patent No.: US 8,705,568 B2
(45) Date of Patent: Apr. 22, 2014

(54) HARDWARE-BASED PARSER FOR PACKET-ORIENTED PROTOCOLS

(75) Inventor: Holger Kropp, Wedemark (DE)

(73) Assignee: Thomson Licensing, Boulogne, Billancourt (FR)

( * ) Notice: Subject to any disclaimer, the term of this patent is extended or adjusted under 35 U.S.C. 154(b) by 560 days.

(21) Appl. No.: 12/735,787

(22) PCT Filed: Feb. 27, 2009

(86) PCT No.: PCT/EP2009/052420
§ 371 (c)(1),
(2), (4) Date: Aug. 18, 2010

(87) PCT Pub. No.: WO2009/106637
PCT Pub. Date: Sep. 3, 2009

(65) Prior Publication Data
US 2010/0322266 A1  Dec. 23, 2010

(30) Foreign Application Priority Data
Feb. 28, 2008 (EP) ..................... 08300122

(51) Int. Cl.
*H04J 3/16* (2006.01)
(52) U.S. Cl.
USPC .................. 370/469; 370/401; 370/419

(58) Field of Classification Search
None
See application file for complete search history.

(56) References Cited

U.S. PATENT DOCUMENTS

| | | | |
|---|---|---|---|
| 6,671,869 B2 * | 12/2003 | Davidson et al. | 716/117 |
| 7,330,924 B1 | 2/2008 | Kao et al. | |
| 2002/0073073 A1 * | 6/2002 | Cheng | 707/2 |
| 2003/0112811 A1 | 6/2003 | Salim | |
| 2005/0122918 A1 | 6/2005 | Johnston | |
| 2005/0281281 A1 | 12/2005 | Nair et al. | |

FOREIGN PATENT DOCUMENTS

WO   WO02080496   10/2002

* cited by examiner

*Primary Examiner* — David Oveissi
(74) *Attorney, Agent, or Firm* — Jeffrey D. Carter

(57) ABSTRACT

The invention relates to the field of packet-oriented protocols. More particularly, the invention concerns a method of operating a protocol parser generated onto a predefined hardware structure. The protocol is packet-oriented and is hierarchically built from different fields in packets. According to the invention, it comprises: —a step of synthesis to define a parser architecture from the hardware structure; —a step of processing parser operations based on the hardware architecture.

15 Claims, 10 Drawing Sheets

| Dest. Addr | Source Addr | T | ⊠ | LEN | ⊠ | ⊠ | ⊠ | ... | time step $t_0$ — time step $t_1$ — time step $t_2$

Fig. 1b

E_II_VLAN

| Dest. Addr | Source Addr | VLAN | T | ID | T | ⊠ | ⊠ | ... | static field — dynamic field — guide field — don't care field

HARDWARE-BASED PARSER FOR PACKET-ORIENTED PROTOCOLS

This application claims the benefit, under 35 U.S.C. §365 of International Application PCT/EP09/052420, filed on Feb. 27, 2009, which was published in accordance with PCT Article 21 (2) on Sept. 03, 2009 in English and which claims the benefit of European patent application No. 08300122.2 filed on Feb. 28, 2008.

FIELD OF THE INVENTION

The invention relates generally to the field of packet-oriented protocols and in particular to a hardware-based parser for such protocols which is reconfigurable between parser operation processes.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A packet-oriented protocol parser also known as "packet parser" or "packet filter" searches in a header of a packet for specific fields e.g., a MAC address, an IP address or a specific port. Fast packet parsers are essential for applications like interfaces, switchers, routers or firewalls. These parsers are often implemented in hardware especially when it is required to recognize those specific fields in high data rate environments.

Transmission according to packet oriented protocols are performed in bursts, so that well known parsers architecture uses FIFOs to store incoming frames and to parse their headers offline, during the pause of a transmission. FIFO is an acronym for "First In, First Out", which is an abstraction in ways of organizing and manipulation of data relative to time and prioritization. The term "FIFOs" refers to the way data stored in a queue is processed and also is used commonly in electronic circuits for buffering and flow control.

In general, it is not required that the parser has to process the packets in real-time. However, if a lot of different data streams have to be processed, large FIFOs are necessary to avoid a transmission interruption or possible frame errors.

In the State of the Art, implementations of packet parsers based on Field-Programmable Gate Arrays (FPGAs) are well-known. The following document contains an illustrative example of such a packet parser: "An Overview of Multiple CAM Designs in Virtex Family Devices", J.-L. Brelet, Xilinx, Application Note (XAPP201), Sep. 23, 1999, found on http://www.xilinx.com/bvdocs/appnotes/xapp201.pdf.

But, in case of application requiring high throughput, like in a 10 Gigabit Ethernet interface, parsing of incoming frames has to be performed necessarily on the fly: in this case, the use of FIFOs is not adapted.

One of the goals of the present invention consists in analyzing in real-time packet-oriented protocol transmissions realized at fixed data rate without any FIFOs, which lead to additional latencies.

This invention deals with a reconfigurable and fast implementation of real-time streaming parser mapped onto a specific hardware architecture based on configurable cells like for example so called 'Content Addressable Memories' (also known under the acronym CAM) and registers, the invention is closely linked with a classification of the protocol fields.

One typical application for this invention is a reconfigurable filter for packet-oriented protocols in fast routers, switches and firewalls.

SUMMARY OF THE INVENTION

The technical problem that present invention intends to solve is to analyse in real-time a packet-oriented protocol incoming stream, when the incoming stream has a fixed data rate.

Thus, the present invention concerns, according to a first aspect, a method of operating a reconfigurable protocol parser generated onto a hardware structure, the protocol parser being used to parse an incoming protocol-oriented data stream transmitted with a fixed data rate, the protocol being packet-oriented and hierarchically built from different fields in packets. According to the invention, it comprises:
- a step of synthesis to define a parser architecture from the hardware structure;
- a step of processing parser operations based on the hardware architecture.

A first advantage of method according to the invention is that, the mapping onto a hardware structure enables an automatic generation of hardware-based protocol parsers which include mostly non-specific components such as reconfigurable cells (e.g., CAM Cells) and registers.

A second advantage of the method according to the invention is the automatic generation is based on a very simple classification of the fields of the protocol according three types of fields: static, dynamic and guide fields.

A third advantage of the method according to invention deals with its reconfigurable feature. This feature enables to follow short term changes in used protocols and represents a major advantage in terms of adaptability.

The present invention concerns, according to a second aspect, a reconfigurable protocol parser generated onto a predefined hardware structure, the protocol parser being used to parse an incoming protocol-oriented data stream transmitted with a fixed data rate, the protocol being packet-oriented and hierarchically built from different fields in packets. According to the invention, the hardware structure comprises:
- a first cell stat_CAM associated with a first match value, the first cell stat_CAM is adapted to match a field content in the incoming data stream with the associated first match value, the first match value being defined during the step of synthesis and can not be changed afterwards; and
- a second cell dyn_CAM associated with a second match value, the second cell dyn_CAM is able to match a field content in the incoming data stream with the associated second match value, the second match value being defined during the step of synthesis and can be modified on request afterwards.

A first advantage of a parser according to the invention is an ability to combine the use of cells dedicated to analyse content of static fields and cells dedicated to analyse content of dynamic fields. This represent an advantage in terms of cost because it is well known that first cells are cheaper than the second ones and need less dye space when implemented in a FPGA or in a ASIC.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

Embodiments of the invention are described in text form hereinafter and are illustrated with drawings, which show in:

FIGS. 1a and 1b show examples of possible 1 or 10 Gigabit Ethernet frames;

FIG. 5 shows a hardware structure of a protocol parser path according to the invention corresponding with Gigabit Ethernet frame presented in FIG. 1a;

FIG. 8b shows an implementation of a hardware structure corresponding to the protocol tree of FIG. 7a;

DETAILED DESCRIPTION OF PREFERRED EMBODIMENTS

Figure 2:
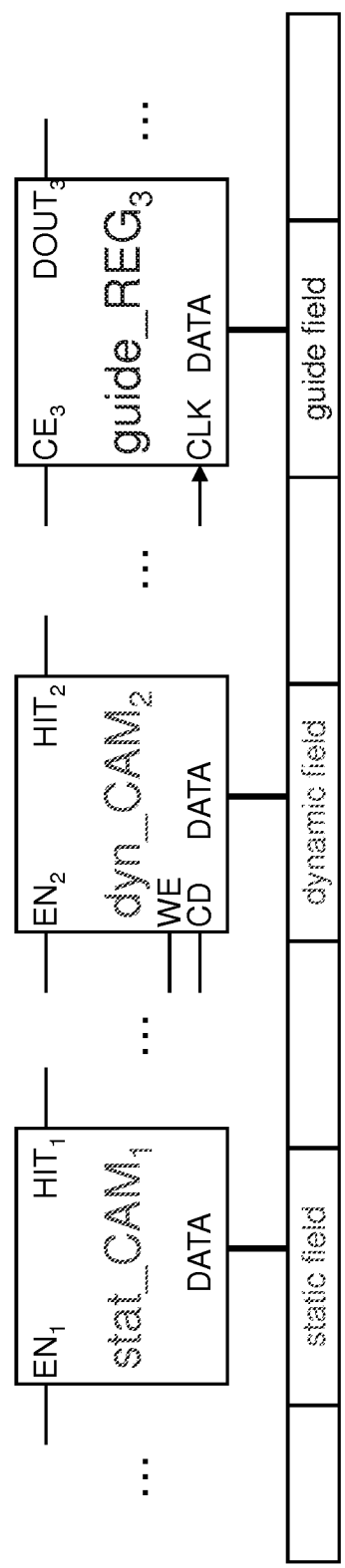
FIG. 2 depicts the essential three different reconfigurable cell types usable in a protocol parser according to the invention.

Most of recent packet parsers are based on configurable cells such as CAM. Considering a data transmission with a fixed data rate using a packet-oriented protocol, e.g., 10 Gigabit Ethernet or Infiniband: these protocols are hierarchically built from different fields in the header, the payload or footer of the packet. Because of a fixed data rate, the transmission of those protocols is performed with a fixed word width at a fixed clock rate.

For example, FIGS. 1a and 1b show two examples of 10G Ethernet frames, where exemplarily a data word width of 64 bits (8 bytes) at a clock frequency of 156.25 MHz is used.

Then, a packet parser has to process a fixed data stream partition, here eight bytes, at each time step t. For the sake of simplicity, successive time steps are identified by increasing indexes, for example $t_2$ follows $t_1$.

Considering the two frames presented in FIGS. 1a and 1b, one can observe that a field is present in both frames, like for example a T field; but this T field is located at a different position in these two frames. For the Ethernet-II stream ('E_II'), due to its position in the frame (on byte position 4 and 5), the T field is read during step $t_1$. For the VLAN tagged stream ('E_II_VLAN'), T field is read during step $t_2$: T field lies on byte positions 0 and 1 in the step $t_2$.

In order to make the stream interpretation easier, it is convenient to separate the different fields in categories according to a common feature classification such as:

"static field", these fields have a content which can not be modified. An example of such a static field would be a field which contains the IP type number in an Ethernet frame. Static field is essential for the ongoing process. It represents a node in the parsing process. If the parser expects at this node only one specific value in an Ethernet frame, e.g. the IP number "0800", a unique match value is associated with this field. If more IP numbers are possible, one has to consider more match values associated with this field, ie. for the same byte position. The match value associated with a static field can be initialized but not changed afterwards.

"dynamic field", these fields have a content which can be modified. An example of such dynamic field would contain an indefinite number of addresses.

"guide field", these fields contain value which can affect ongoing operations. An example of such guide field would contain length information or an identification number which can be used by parser or by any peripherals connected to the parser.

In the streams, there are also fields which can not be classified according to the field types shown above: such fields are named as 'don't care' which represents a fourth type of fields, like shown in FIGS. 1a and 1b.

According to this classification, fields belonging to one of the first three types contain data which are useful for the analysis of the stream by the parser. There is no need to analyse fields which belongs to the 'don't care' type.

As depicted in FIG. 2, three different cells exist which are used to analyse the content of the fields belonging to one of the first three types:

a first cell stat_CAM analyses a static field content;
a second cell dyn_CAM which analyses a dynamic field;
when a protocol includes a guide field, the value contained in the guide field has to be stored in a guide register guide_REG in order to affect the ongoing operations.

Figure 3:
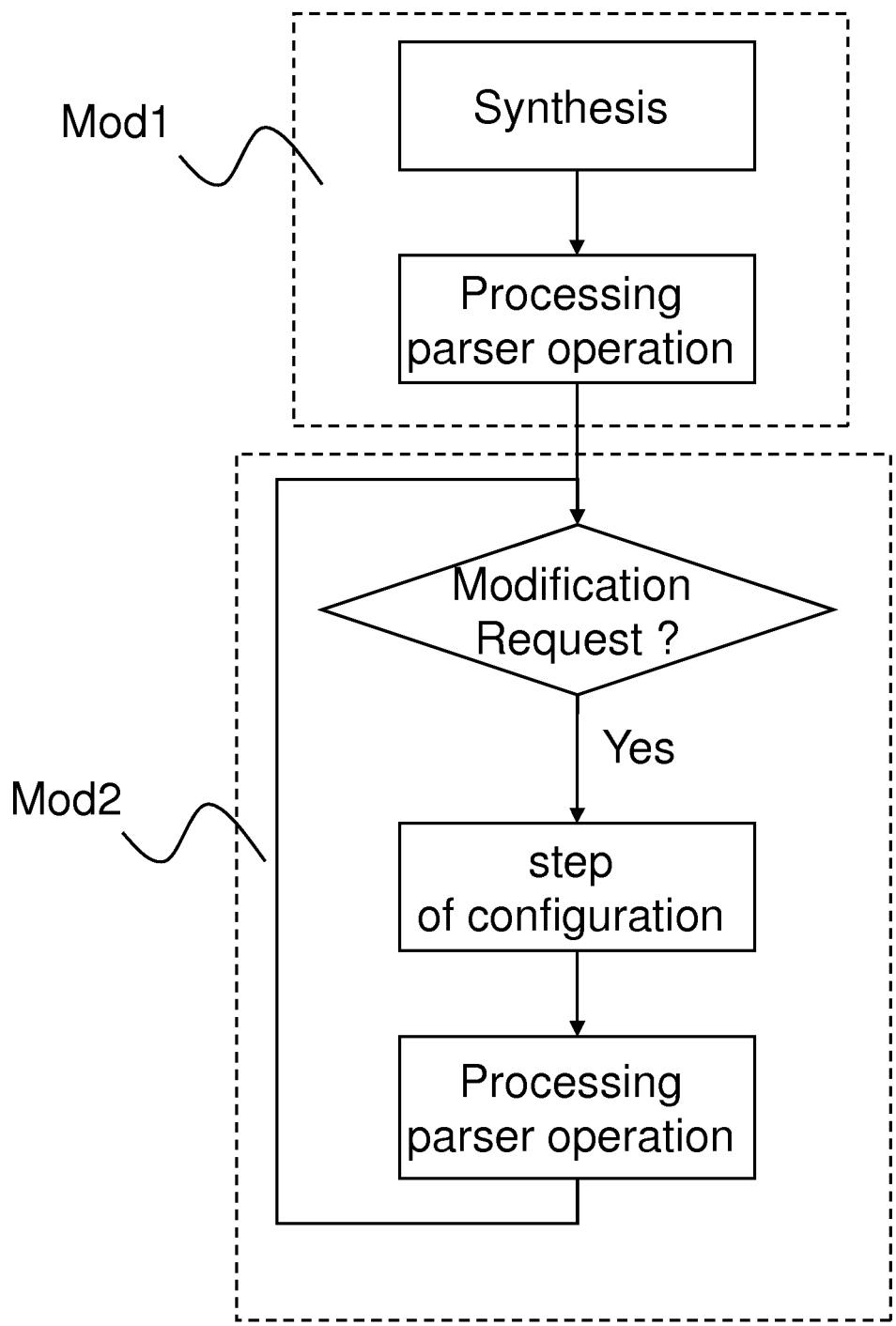
FIG. 3 shows a method of operating a reconfigurable protocol parser generated onto a hardware structure according to the invention.

The protocol parser according to the invention is generated onto a hardware structure which comprises cells and registers dedicated to analyse fields. Particularly, the parser comprises a first cell stat_CAM associated with a first match value and a second cell dyn_CAM associated with a second match value. Such a parser operates according to two distinct modes Mod1 and Mod2 as shown on FIG. 3:

a first mode of operation Mod1 which starts with a step of synthesis of parser and which ends when a modification of a match value associated with one of its second cell dyn_CAM is required;

a second mode Mod2 which starts in loop when a modification of a match value associated with one of its second cell dyn_CAM is required;

The first mode of operation comprises:
a step of synthesis to define a parser architecture from the hardware structure;
a step of processing parser operations based on the hardware architecture.

Advantageously, the step of synthesis comprises sub-steps of:
classifying the fields of the protocol into:
 static fields whose content can not be modified; —dynamic fields whose content can be modified on request; —guide fields which contains a value that can affect an ongoing operations;
definition of match values to search in the protocol; —assigning each match value to a static or a dynamic type of field; —generating an optimized parser architecture comprising cells and registers from the protocol classification and the match values, cells being dedicated to analyze a static field or a dynamic field, registers being able to receive the value located in a guide field;

mapping the fields onto the defined parser architecture of the hardware structure; and associating each match value to its assigned field.

Here follows a brief description of the step of synthesis. First of all, one has to classify the protocol in order to derive an appropriate parser for the configuration and run time mode. This classification step will influence the parser design, because a designer already decides during classification step, if a field in a protocol should be classified as belonging to static field type or dynamic field type. Field values, which have to be passed out of the parser, should be specified as guided fields. Then, the following requirements have to be considered: Should the parser be small ? Are there real-time requirements, that has to be considered ? Should the parser be very flexible ?

Some requirements are incompatible with other requirements. E.g., if a main requirement is the parser should be very small, the designer of the parser has to use only static cells. Then, the flexibility of the parser will be reduced, because the match values can be modified during parsing processes.

In case the used FPGA is "dynamic partial reconfigurable" one does need to use dynamic cells. Then, one gets a very fast parser, saving resource, because LUT content, LUT are presented below, in the static cells can be reconfigured also during run time.

After the classification step, the whole architecture of the parser has to be specified. This can be done automatically by a module generator or by hand.

Then, before the parser is ready to receive packet-oriented protocol data and perform the parsing process operation, the FPGA configuration is performed with the parser architecture. The following steps should illustrate how a real-time parser is generated in a 10G Ethernet interface architecture. The resulting parser design gets every clock cycle 8 data byte at a frequency equal to 156 MHz, i.e., the design is synchronous.

Advantageously, the step of processing parser operations consists in:

matching parts of the incoming data stream with the match values;

reading values from the incoming data stream. During the step of processing parser operations, the incoming data stream has to pass successively through all cells and registers. Therefore, an enabling signal EN enables the parsing operations for each field.

If a match for a specific field occurs, it is signalized by an output signal HIT of the corresponding unit. This output signal HIT can be used to enable also a next comparison.

Advantageously, first and second cells and registers of the hardware structure, also later named "units", are arranged in a linear chain.

Figure 4:
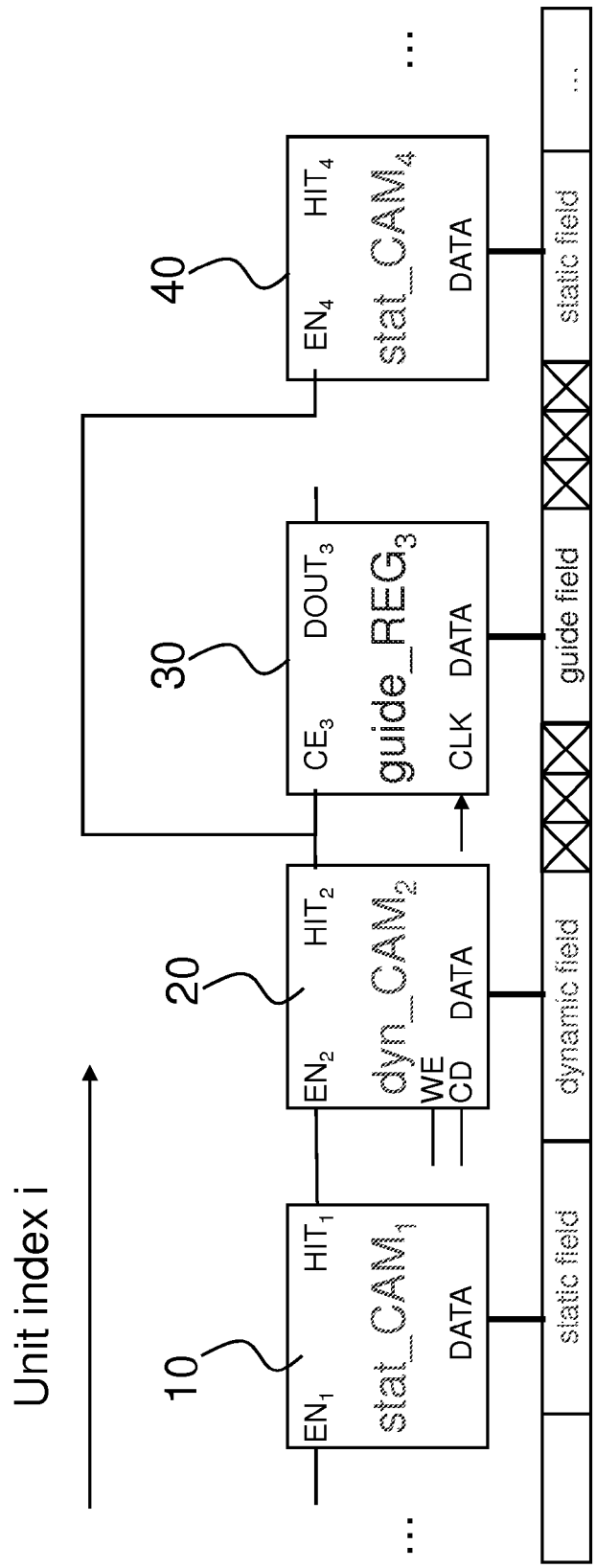
FIG. 4 shows a generic hardware structure of a protocol parser path according to the invention.

A first example of such a structure is shown in FIG. 4. A description of the process of parser operations follows:

If enabled by an enabling signal EN, a unit, for example a first cell stat_CAM$_1$ performs a fast and direct comparison between a first match value and an incoming protocol data DATA. If DATA and the first match value are identical, an output signal HIT is delivered immediately by the first cell. stat_CAM$_1$ has to be initialized only once before the first parser operations. The first match value is associated with the first cell stat_CAM$_1$ at the beginning of a first mode of operation Mod1, and can not be modified later.

Advantageously, a first cell stat_CAM1 of the parser receives an enabling signal EN1 and delivers an output signal HIT1 when a match occurs between a content of a static field in the incoming data stream and the associated first match value.

Advantageously, the hardware structure is a FPGA and the first cell stat_CAM$_1$ of the parser is a Content Addressable Memory.

In case of SRAM based FPGAs, the first cell stat_CAM1 is built from a "Look-up-table" (LUT). A LUT is the basic element of such an FPGA, because it is used to emulate every combinatorial logical function, e.g., AND, OR, XOR, etc. Furthermore, it can also be used as small distributive ROM or RAM.

Figure 11:
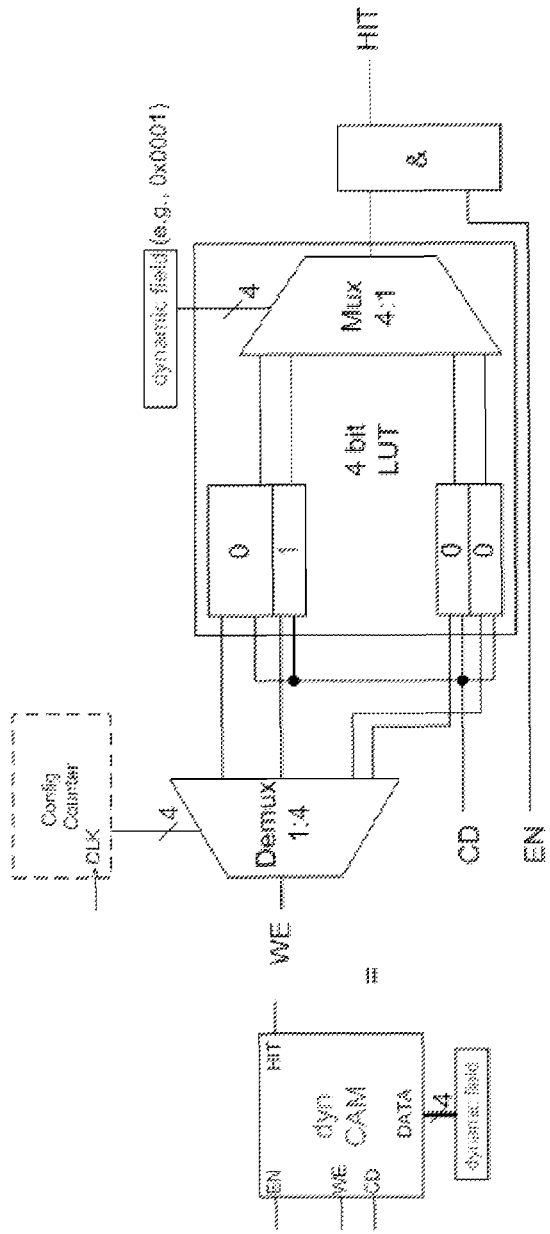
FIG. 11 shows a first dynamic cell architecture when implemented in a FPGA.

FIG. 11 shows how the first cell stat_CAM1 works during the parsing process. It uses the AND functionality to perform a matching with an input pattern and the LUT content during the parsing process. The first cell stat_CAM1 is built from a 4-bit input LUT. For the specific configuration pattern of the four LUT-cells (called a3, ..., a0) a HIT signal will derive only if the incoming data has exactly the value $0x2_{16}=0010_2$. This corresponds to the special AND function: a3 & a2 & a1 & a0. Others inputs will lead to no HIT. If larger fields are necessary, one has to build a chain of those 4-bit static cells.

The parsing process in case of the second cell dyn_CAM is performed in the same manner as in case of the first cell stat_CAM1. The only difference is their configurability. A first cell stat_CAM1 can be configured only once before synthesis starts. A second cell dyn_CAM can be configured before synthesis, and before or after the parsing process. Therefore, additional functionality is required. FIG. 12 shows, that the second cell dyn_CAM has additional inputs (Write Enable (WE), and Configuration Data (CD)) for overwriting the content in the LUT cells i.e., the second cell dyn_CAM uses RAM functionality during the configuration and a AND function to perform the matching with an input pattern during the parsing process. The CD can be provided in a parallel or sequential manner, leading to different configuration times and LUT architectures.

Advantageously, the hardware structure is an Application Specific Integrated Circuit (ASIC) and the first cell stat_CAM$_1$ of the parser is an AND gate.

In the example of FIG. 4, the output signal HIT$_1$ enables a second cell dyn_CAM$_2$. dyn_CAM$_2$ is also used to perform a fast and direct comparison between a second match value and an incoming data DATA. dyn_CAM$_2$ differs from stat_CAM$_1$ in that it is reconfigurable. In other words, the second match value associated with the second cell dyn_CAM$_2$ can be modified between two successive steps of processing parser operations. One can modify an associated match value when parser is in the second mode of operation Mod2.

The second mode of operation Mod2 starts when a modification of a defined match value is required. It comprises:

a step of parser configuration to implement a required modification; and a step of processing parser operations based on the modified architecture structure, run until a new modification of a defined match value is required.

The step of parser configuration comprises sub-steps of:

modifying the match value as required;

mapping the modified match value onto dynamic fields of the parser architecture.

To perform this modification, when an enabling signal WE (for "Write enable") of a second cell dyn_CAM$_2$ is set, a new second match value CD is read-in. This new second match value is associated with the second cell stat_CAM each time the parser enters the second mode of operation.

Advantageously, a second cell $dyn\_CAM_2$ comprises an enabling signal $EN_2$ and delivers a signal output $HIT_2$ when a match occurs between the incoming data stream and the associated second match value.

Advantageously, the hardware structure further comprises a register guide_REG adapted to receive data located in a guide field of the incoming data stream, where data can affect ongoing operations.

As noticed above, the considered protocols, e.g. 1G or 10G Ethernet, consist of a concatenation of various field types. Then, the hardware structure is built from a concatenation of the mentioned cells: first cells, second cells and guide registers.

Thus, the hardware structure of the parser is similar to a chain comprising different units.

If a value contained in a guide field has to be stored, a guide register is inserted within the chain, like for example $guide\_REG_3$ in the example of the FIG. 4. An enabling signal $CE_3$ of this guide register $guide\_REG_3$ is connected to the output signal $HIT_2$. Corresponding output signal $DOUT_3$ is not connected to $EN_4$.

Output signal of the last unit of the chain signalizes that all units have been passed, so the complete protocol is accepted by the parser. Not relevant Fields ("don't care" fields) are not involved in this connection.

Figure 5:
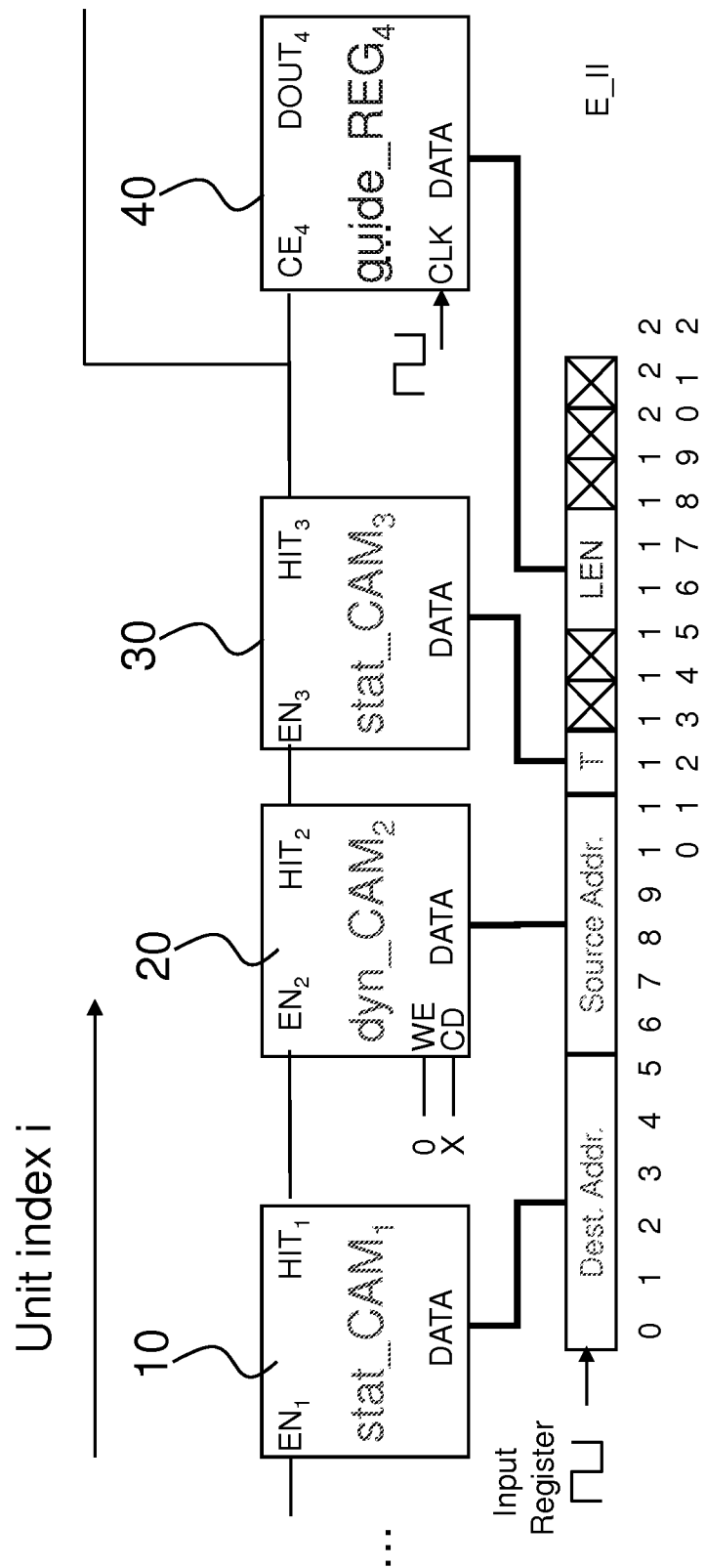

A second example is given in FIG. 5 for an Ethernet-II frame. It is assumed that an input register, not represented, stores the incoming data stream synchronous to the data rate. The protocol begins with a static field, so that the first unit in the parser is a first cell $stat\_CAM_1$.

The parsing process starts when the enabling signal $EN$, of the first cell $stat\_CAM_1$ becomes active.

When the first field in the input register, e.g., the destination address (Dest. Address'), matches with the first match value associated with the first cell $stat\_CAM_1$, the output signal $HIT_1$ enables the following second cells $dyn\_CAM_1$ to detect the next field, e.g., a specific 'Source Address'.

If an output signal $HIT_2$ delivered by a second cell $dyn\_CAM_2$ becomes active, the detection continues until an output signal delivered by the latest unit of the chain becomes active. As already mentioned above, possible guide register $guide\_REG_4$ can also be enabled through enabling signals $CE_1$. But this guide register is not involved in the continuation of the chain of signals. This role is reserved to first and second cells.

Advantageously, the parser architecture has a form of a tree linking together cells and registers.

Depending on the strategy chosen by a person that configures the parser, from a given classification of the protocol fields, one can generate protocol parser having various architectures of cells and registers which are optimised on the basis of cost consideration, or number of cell used.

Advantageously, the generation of parser architecture minimizes number of cells used in the hardware structure.

Advantageously, the generation of parser architecture privileges use of cells dedicated to static fields analysis.

Advantageously, the units are arranged in a linear chain.

Advantageously, it is also possible to generate a parser architecture having a tree shape by a method according to the invention. This kind of architecture contains not only one path but also some variants of protocols. For example, if different values are waited for a given field, this results in a branch in the tree.

Figure 6:
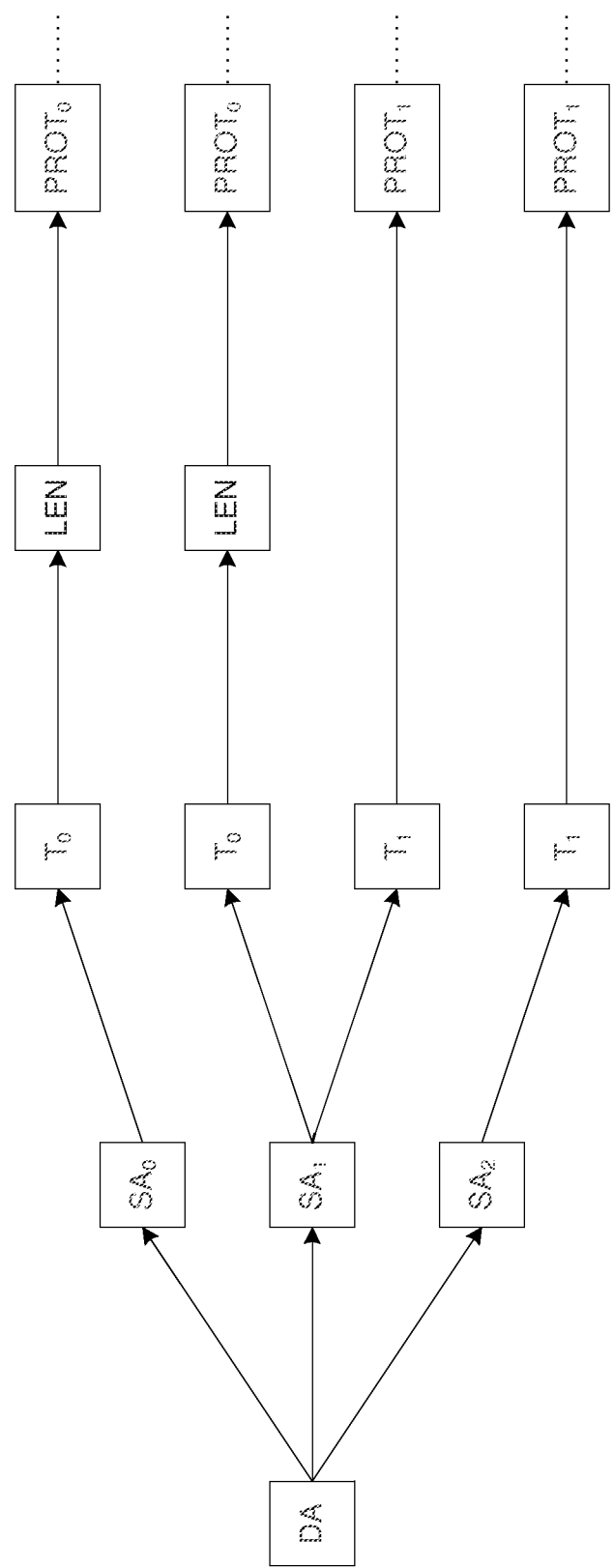
FIG. 6 represents an example of a protocol tree with different paths.

FIG. 6 illustrates such a parser. In this figure, arcs represent a concatenation between the fields. Based on the proposed parser structure above, some more additional units are necessary to extend the forwarding of the enabling signals. Exemplary, FIG. 6 depicts a possible protocol tree for Ethernet-II.

It starts with a root node at the left related to the "Destination address" (DA) detection and branches in the next level into three possible nodes (e.g., $SA_0$, $SA_1$, $SA_2$) corresponding with three "source Addresses". Afterwards here some of the following paths are the same, e.g., $SA_1$ has the same path as $SA_0$ and $SA_2$ as well. The next level relates to the two detectable T fields contents (only two match values $T_0$ and $T_1$ are foreseen). Next level consists in getting values from guide fields (LEN value is stored). Last level consists in detecting two different contents ($PROT_0$ and $PROT_1$) of a static field.

Figure 7:
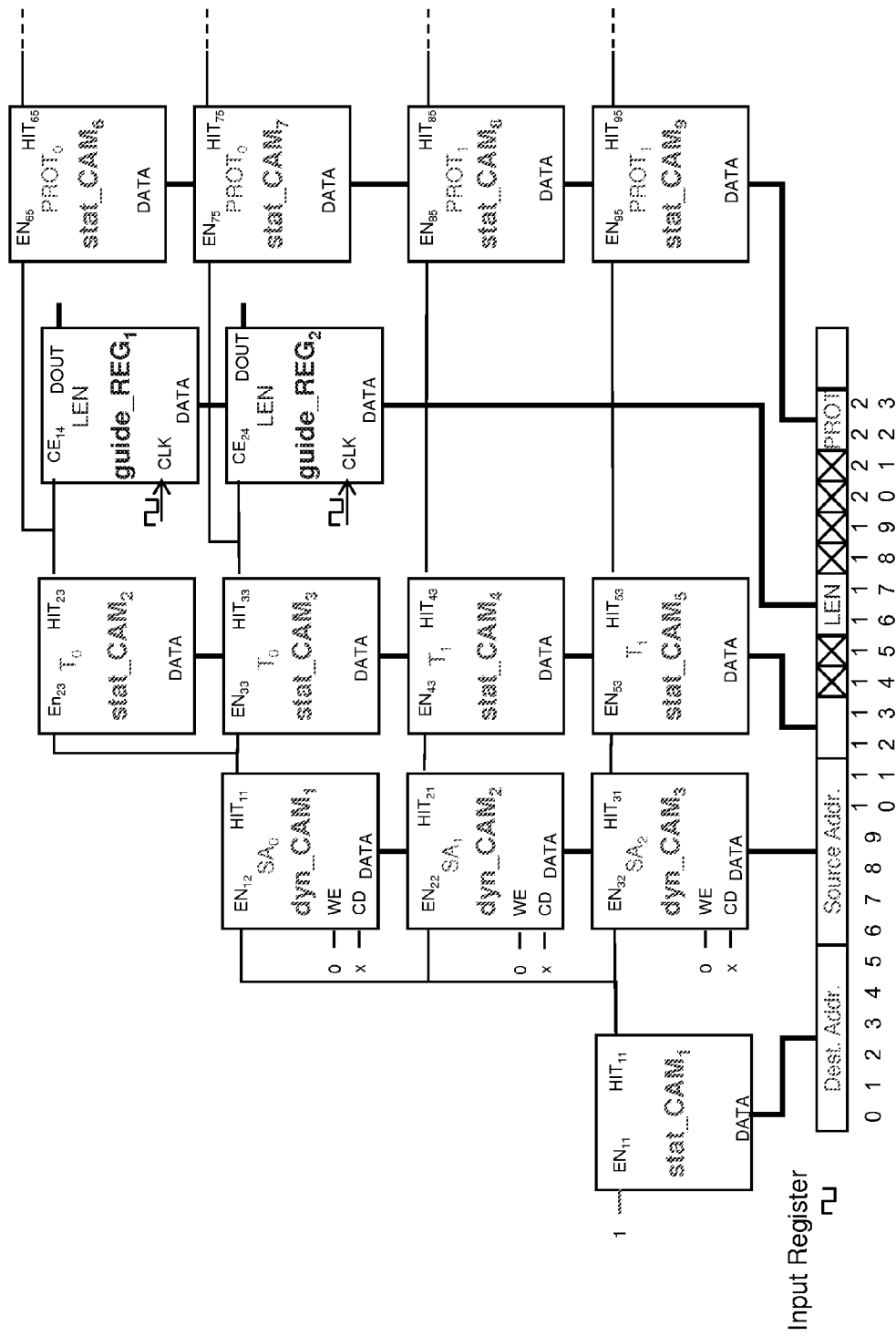
FIG. 7 shows an implementation of hardware structure corresponding with the protocol tree presented in FIG. 6.

Following this example, the mapping of this tree architecture onto a parser structure can be seen in FIG. 7. For each field or node, respectively, one gets an appropriate unit, so that the architecture can be build directly from the parser tree represented in FIG. 6.

However, in such an example it is possible to reduce the number of paths and therewith the number of units as well. The number of cells and registers in the architecture can be minimized without affecting functionality, as long as the enabling signals remain the same. As long as paths use the same nodes, it is possible to merge them. If the path is forked because of different nodes in the ongoing path, it is necessary to distinguish them, with a separate path.

Figure 8A:
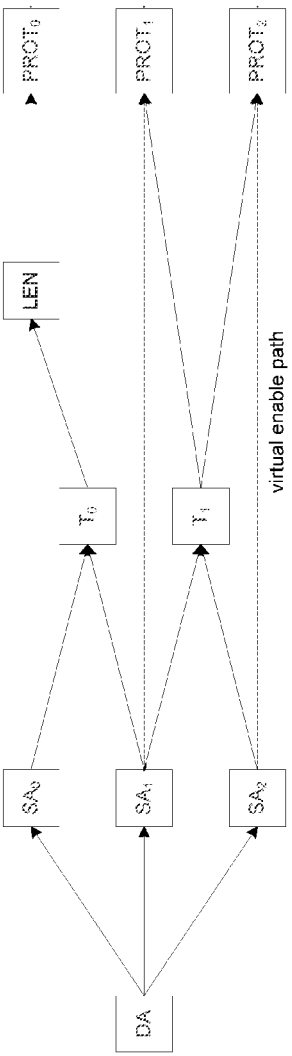
FIG. 8a shows a merged version of the protocol tree represented in FIG. 5.
Figure 8B:
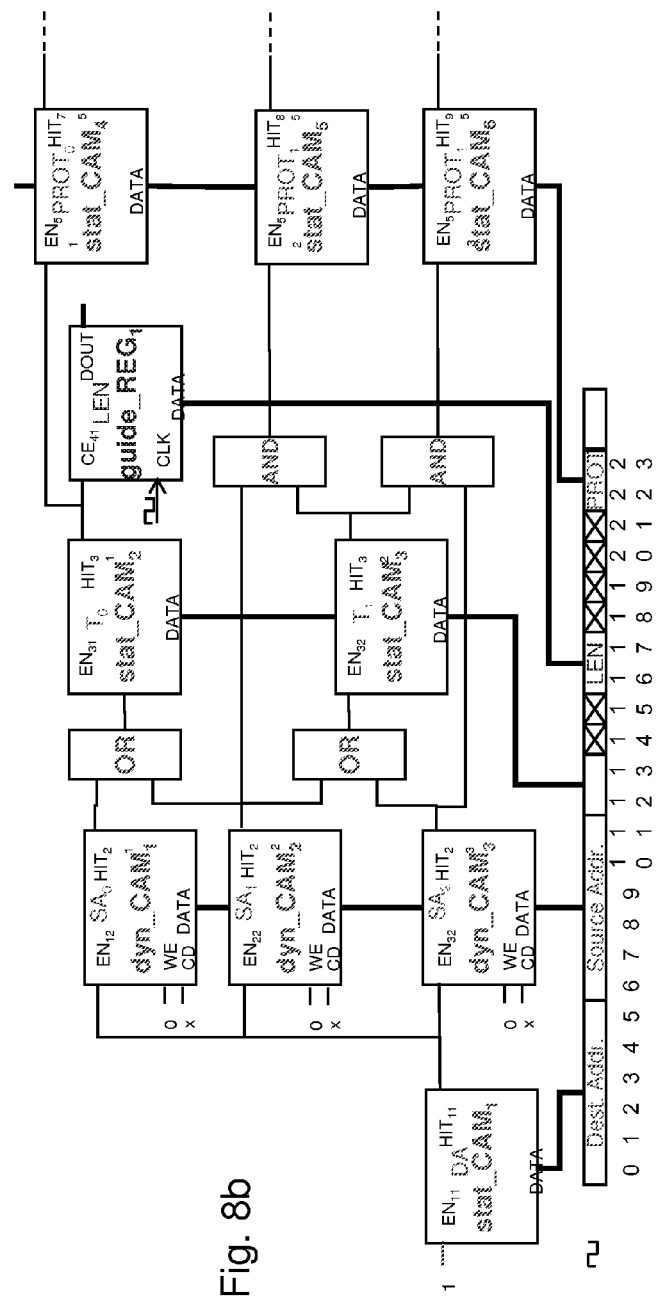

FIG. 8a and FIG. 8b illustrate such merges. FIG. 8a represents a protocol tree similar to the protocol tree shown in FIG. 6. T field can take only two values ($T_0$, $T_1$), then it is possible to merge the upper two paths after $SA_0$ and $SA_1$ shown on FIG. 6 into a single path because the two paths are identical ($T_0$ match value) as shown in FIG. 8a.

In FIG. 8a, the lower two paths after $SA_1$ and $SA_2$ converge on the same node ($T_1$ match value) but make a branch afterwards. To distinguish wrong source from right source, virtual paths are inserted between $SA_1$ and $PROT_1$ (dotted lines) and between $SA_2$ and $PROT_2$. These virtual paths symbolize that node $PROT_1$ should be addressed only by $SA_1$ and node $PROT_2$ only by $SA_2$.

For the parser architecture, two additional basic elements have to be inserted. A relatively regular architecture without large controlling can be achieved, if the following rules are considered:

- a merge of identical nodes results in a single 'merged' unit. All enabling signals incoming this 'merged' unit have to be combined by a merger unit, e.g., by a logical OR gate;
- merged paths can be retained until a branch representing an alternative occurs, i.e., if different nodes follow (for example, $PROT_1$ or $PROT_2$ follows $T_1$);
- if a 'merged' unit delivers an output signal which is used to enable more than one following unit, it is necessary to avoid the following unit is enabled for a wrong predecessor paths. For example, in FIG. 8a $PROT_1$ and $PROT_2$ can be reached both from the cell corresponding to $T_1$. In order to select the right path, in front of $T_1$, e.g., $PROT_2$ should only be enabled if SA2 has a HIT signal before (consider virtual path). This is derived by a combination of the HIT signals from T1 and SA2 via an AND gate.
- guide registers can always be merged, if a merger unit is used to combine the 'GE' enabling signals. The following units are handled as described above independently from the insertion of registers.

FIG. 8b shows the appropriate mapping onto the parser architecture corresponding with the protocol tree of FIG. 8a. Names of the nodes ($SA_0$, $SA_1$, $SA_2$ etc. . . . ) are reported on cells to illustrate the mapping.

Because of a fixed data rate, the analyzed data word width is limited during a time step. This has also an influence on the input register, the cells and their enabling signals EN. As mentioned above, it is assumed, that an input register stores the incoming data stream synchronous to the data rate. The input register needs only a word width compliant with a fixed number of bits, which can be processed at each clock cycle. According to the example shown in FIG. 1, one gets an input width of 64 bits per time step duration (e.g., at 156.25 MHz).

Additionally, if the sum of the word widths of each used unit doesn't fit with the width of the input register, one has to partition the first or second cell or the guide register in accordance to this width.

Figure 9:
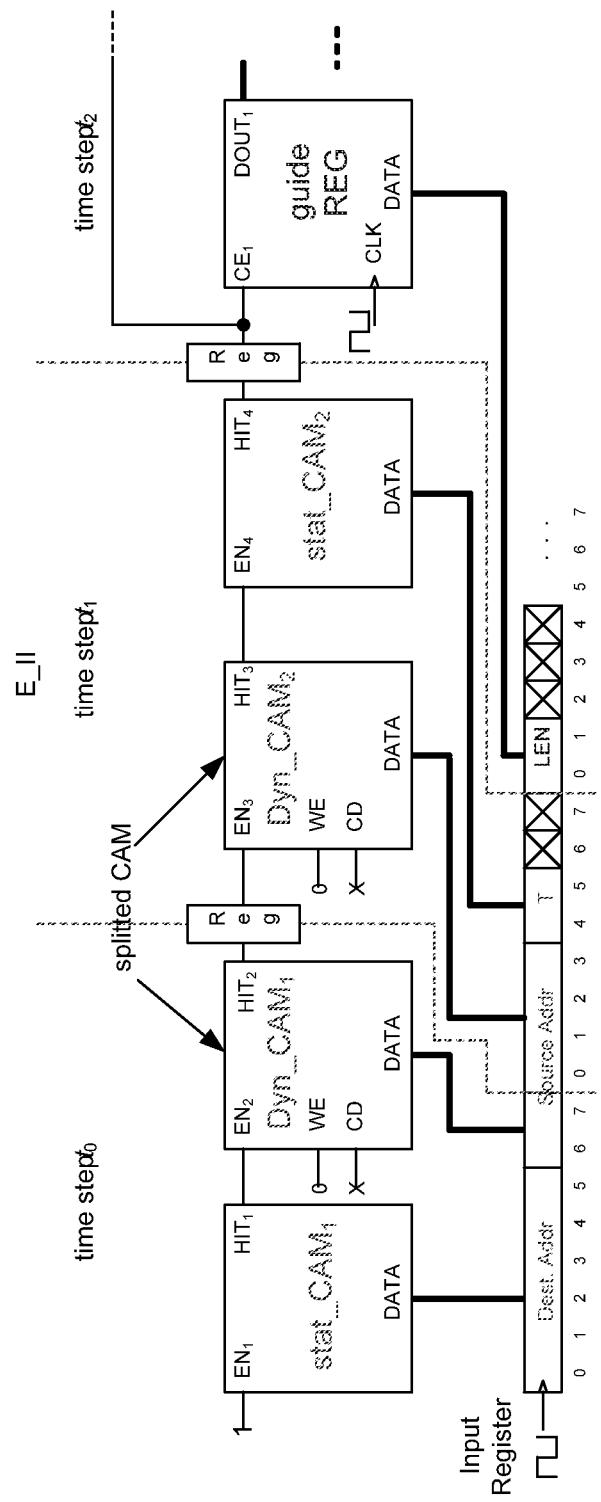
FIG. 9 shows a second implementation of hardware structure corresponding with protocol tree presented in FIG. 5 under consideration of the separation into similar time steps for a fixed data rate.
Figure 10:
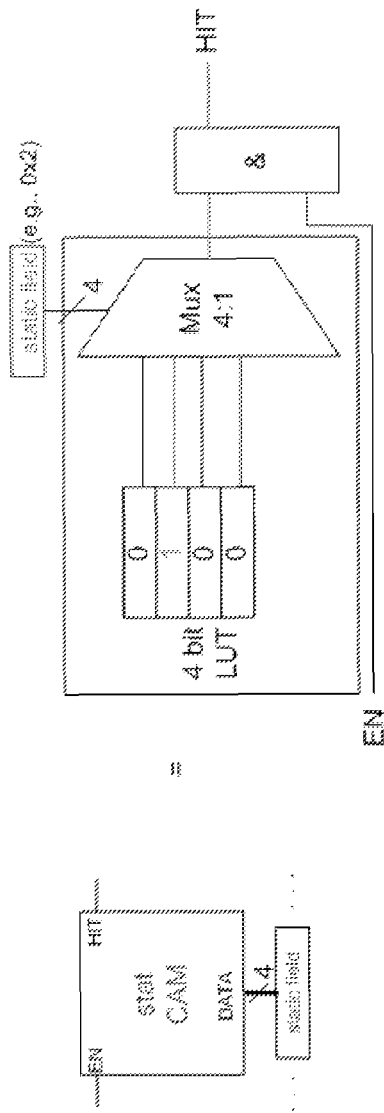
FIG. 10 shows a first dynamic cell architecture when implemented in a FPGA.

FIG. 9 shows an example for a second cell having a total word width of 48 bits (or 6 bytes) which is split into two separate chained second cells $dyn\_CAM_1$, $dyn\_CAM_2$. During the first time step $t_o$, $dyn\_CAM_1$ uses an input word width corresponding to 2 bytes. During the following time step $t_1$ $dyn\_CAM_1$ uses a word width corresponding to 4 bytes.

Furthermore, to enable the units correctly during all time steps, insertion of additional pipeline registers are required for each intermediary HIT signal, where an intermediary HIT signal is a signal crossing a border from one time step to the next time step, as shown in FIG. 9.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A protocol parser generated onto a hardware structure, the protocol parser parsing an incoming protocol-oriented data stream transmitted with a given data rate, the protocol being packet-oriented and hierarchically built from different fields in packets, wherein the fields are classified in three different categories of fields, comprising:
   static fields having contents which can not be modified;
   dynamic fields having contents which can be modified; and
   guide fields containing values which can affect ongoing operation;
   and further wherein the hardware structure comprises:
   a first cell associated with a first match value, the first cell being operative to match static field content in the incoming data stream with the associated first match value, wherein the first match value is defined during a step of synthesis and can not be changed afterwards;
   a second cell associated with a second match value, the second cell being operative to match dynamic field content in the incoming data stream with the associated second match value, wherein the second match value is defined during the step of synthesis and can be modified on request afterwards; and
   a register operative to receive data located in the guide fields of the incoming data stream.

2. The protocol parser according to claim 1, wherein the first cell receives an enabling signal and delivers an output signal when a match occurs between the static field content in the incoming data stream and the associated first match value.

3. The protocol parser according to claim 1, wherein the second cell comprises an enabling signal and delivers an output signal when a match occurs between the incoming data stream and the associated second match value.

4. The protocol parser according to claim 1, wherein the hardware structure comprises a Field Programmable Gate Array and the first cell comprises a Content Addressable Memory.

5. The protocol parser according to claim 1, wherein the hardware structure comprises an Application Specific Integrated Circuit and the first cell comprises an AND gate.

6. A device, comprising:
   means for receiving an incoming data stream transmitted in accordance with a given protocol and a given data rate, the given protocol being packet-oriented and hierarchically built from different fields in packets, wherein the fields are classified according to at least three different categories of fields comprising: (i) static fields having contents which can not be modified, (ii) dynamic fields having contents which can be modified, and (iii) guide fields containing values which can affect ongoing operation; and
   means for parsing the incoming data stream, wherein the parsing means comprises:
   a first cell associated with a first match value, the first cell being operative to match static field content in the incoming data stream with the associated first match value, wherein the first match value is defined during a step of synthesis and can not be changed afterwards;
   a second cell associated with a second match value, the second cell being operative to match dynamic field content in the incoming data stream with the associated second match value, wherein the second match value is defined during the step of synthesis and can be modified on request afterwards; and
   a register operative to receive data located in the guide fields of the incoming data stream.

7. The device according to claim 6, wherein the first cell receives an enabling signal and delivers an output signal when a match occurs between the static field content in the incoming data stream and the associated first match value.

8. The device according to claim 6, wherein the second cell comprises an enabling signal and delivers an output signal when a match occurs between the incoming data stream and the associated second match value.

9. The device according to claim 6, wherein the parsing means comprises a Field Programmable Gate Array and the first cell comprises a Content Addressable Memory.

10. The device according to claim 6, wherein the parsing means comprises an Application Specific Integrated Circuit and the first cell comprises an AND gate.

11. A method, comprising:
    receiving an incoming data stream transmitted in accordance with a given protocol and a given data rate, the given protocol being packet-oriented and hierarchically built from different fields in packets, wherein the fields are classified according to at least three different categories of fields comprising: (i) static fields having contents which can not be modified, (ii) dynamic fields having contents which can be modified, and (iii) guide fields containing values which can affect ongoing operation; and parsing the incoming data stream via hardware structure comprising:

a first cell associated with a first match value, the first cell being operative to match static field content in the incoming data stream with the associated first match value, wherein the first match value is defined during a step of synthesis and can not be changed afterwards;

a second cell associated with a second match value, the second cell being operative to match dynamic field content in the incoming data stream with the associated second match value, wherein the second match value is defined during the step of synthesis and can be modified on request afterwards; and a register operative to receive data located in the guide fields of the incoming data stream.

12. The method according to claim 11, wherein the first cell receives an enabling signal and delivers an output signal when a match occurs between the static field content in the incoming data stream and the associated first match value.

13. The method according to claim 11, wherein the second cell comprises an enabling signal and delivers an output signal when a match occurs between the incoming data stream and the associated second match value.

14. The method according to claim 11, wherein the hardware structure comprises a Field Programmable Gate Array and the first cell comprises a Content Addressable Memory.

15. The method according to claim 11, wherein the hardware structure comprises an Application Specific Integrated Circuit and the first cell comprises an AND gate.

* * * * *